FAIL-SAFE DOMAIN GENERATOR FOR SINGLE
WALL DOMAIN ARRANGEMENTS
Filed Dec. 22, 1971

United States Patent Office 3,706,081
Patented Dec. 12, 1972

3,706,081

FAIL-SAFE DOMAIN GENERATOR FOR SINGLE WALL DOMAIN ARRANGEMENTS

Andrew Henry Bobeck, Chatham, Roman Kowalchuk, Somerville, and John Peter Reekstin, Jr., Morristown, N.J., assignors to Bell Telephone Laboratories, Incorporated, Murray Hill, N.J.

Filed Dec. 22, 1971, Ser. No. 210,906
Int. Cl. G11c *11/14*
U.S. Cl. 340—174 TF 8 Claims

ABSTRACT OF THE DISCLOSURE

A generator for single wall domain arrangements of the field access type is provided by locally reducing the separation between the plane in which the pattern of magnetically soft channel-defining elements lies and the domain layer. A domain is generated at that portion of the pattern, where the separation is reduced, for each rotation of the familiar rotating field which moves domains along the channel.

FIELD OF THE INVENTION

This invention relates to magnetic storage arrangements and, more particularly, to such arrangements which store information as patterns of single wall magnetic domains.

BACKGROUND OF THE INVENTION

A single wall domain is a magnetic domain characterized by a single domain wall which closes upon itself in the plane of a layer of magnetic material in which it can be moved. Inasmuch as the wall closes on itself, a single wall domain is self-defined and is capable of being moved anywhere in the plane. Domains of this type are disclosed in U.S. Pat. 3,460,116 of A. H. Bobeck-U. F. Gianola-R. C. Sherwood-W. Shockley issued Aug. 5, 1969.

Layers of magnetic materials in which such domains can be moved typically comprise single crystal films having a preferred direction of magnetization normal to the plane of the film. A domain in such a material is visualized as a right circular cylinder positive at the top surface of the layer and negative at the bottom forming a magnetic dipole along an axis normal to the plane of movement. When exposed to polarized light, a single wall domain appears as a circular-shaped disk relatively dark or light, in contrast with a remainder of the layer, when viewed through an analyzer.

One mode of moving domains employs a pattern of magnetically soft elements adjacent to the surface of a layer in which single wall domains are moved. In response to a magnetic field reorienting in the plane of the layer, changing pole patterns are generated in the elements. The elements are arranged to displace domains along a selected path in the layer as the in-plane field reorients. The familiar T- (or Y-) bar overlay arrangement responds to a rotating in-plane field is so displace domains. Arrangements of this type are called "field-access" arrangements and are disclosed in A. H. Bobeck Pat. 3,534,347 issued Oct. 13, 1970. Regardless of the mode of propagation, localized magnetic field gradients cause domain movement. In the field-access mode, those gradients are caused by the accumulation of attracting and repelling poles in the overlay elements due to the in-plane field.

Typically, single wall domain arrangements operative in the field-access mode comprise periodic patterns of elements for moving domain patterns simultaneously along parallel channels. The elements are spaced apart sufficiently far so that a domain responds to the poles in only a single element. Due to this spacing, the movement of domains from one channel to another is inhibited also. Copending application Ser. No. 160,841 filed July 8, 1971 for A. H. Bobeck and H. E. D. Scovil, on the other hand, describes an arrangement of the field-access type in which the magnetically soft elements of the periodic pattern are closely spaced so that a domain moves along the pattern in response to poles in more than one element at a time and lateral displacement of domains from one channel to another is possible. Closely spaced V-shaped elements define a "fine-grained" chevron pattern of this latter type.

A convenient generator for introducing domains into a field-access domain arrangement comprises a relatively large "generator" area of magnetically soft material adjacent to the layer of material in which domains move and at the beginning of a domain channel. A seed domain moves about the periphery of the generator area producing a domain for movement along the channel for each cycle of the rotating in-plane field in an operation which appears through the microscope as a "taffy-pulling"operation.

Generators of this type are typically large to reduce the associated demagnetizing fields in an effort to ensure that the seed domain remains at the periphery of the generator area. But as higher speeds are realized with devices of this type, the faster the seed domain has to travel about the periphery of the area. Since the periphery is large compared to a period (three domain diameters) of the propagation pattern, the generator is the first element to fail as the mobility limit characteristic of the domain layer is reached. Moreover, should the seed domain be annihilated as, for example, by the presence of a stray magnetic field, the generator no longer produces domains.

BRIEF DESCRIPTION OF THE INVENTION

The present invention is based on the recognition that the spacing between the plane of the propagation pattern and the domain layer is an important factor in the performance of a field-access arrangement and that where that separation is reduced locally, a domain is generated for each cycle of the propagation (in-plane) field.

In one specific embodiment of this invention, a periodic pattern of closely spaced V-shaped elements (viz: the chevron pattern) defines a multistage closed loop propagation channel in which domains are moved in response to a magnetic field rotating in the plane of domain movement. The pattern is formed on a spacing layer deposited on the layer in which the domains move. An opening is formed in the spacing layer and the pattern of elements is formed such that ends of some elements are in contact with the domain layer through the opening, thus forming a domain generator in accordance with this invention. The generator produces a domain during each cycle of the rotating field. A domain annihilator couples the propagation channel "down stream" from the generator for selectively annihilating domains thus producing a data stream for recirculation.

DETAILED DESCRIPTION

Figure 1:
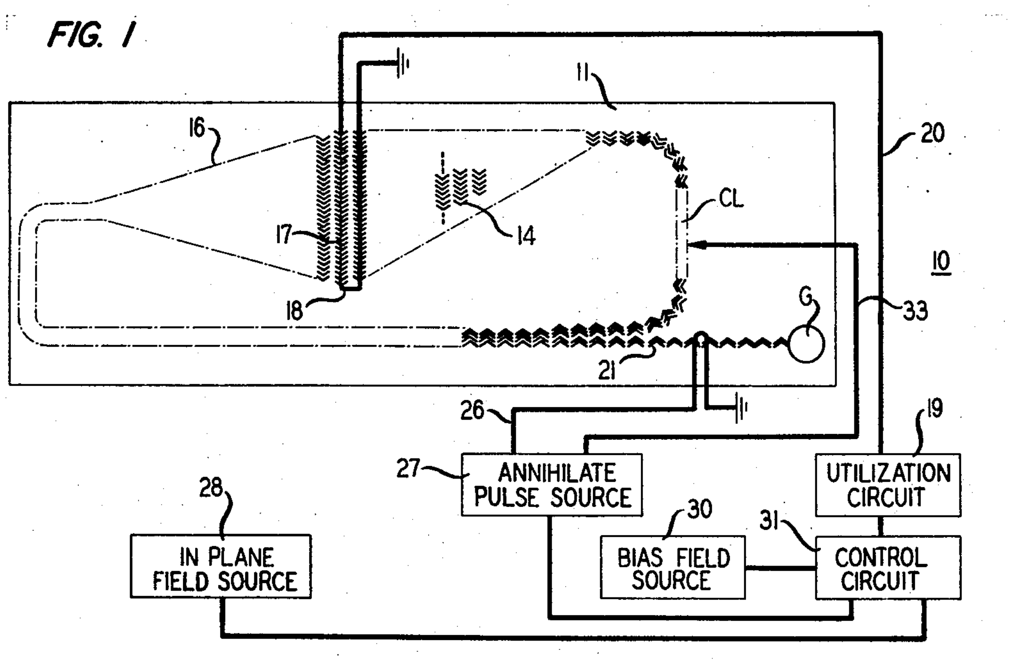
FIG. 1 is a top view of a magnetic arrangement including a fine-grained propagation pattern with a domain generator in accordance with this invention.

FIG. 1 shows a single wall domain arrangement 10 including a domain generator in accordance with this invention. The arrangement includes a layer 11 in which single wall domains can be moved. Typically, layer 11 is formed by well-known liquid phase epitaxial techniques on a suitable nonmagnetic crystal substrate, not shown.

Figure 2:
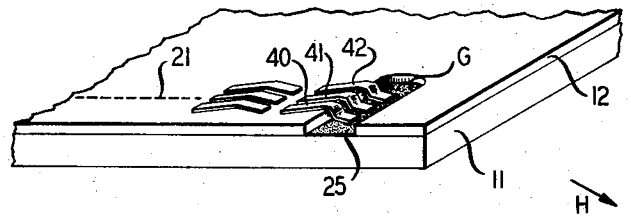
FIG. 2 is a plan view partially in cross section of the arrangement of FIG. 1 showing the reduced separation between the propagation pattern and the layer in which domains move at the generator.

FIG. 2 shows ap lan view of a portion of the arrangement of FIG. 1 showing a spacing layer 12, typically of silicon dioxide, coating layer 11. A pattern 14 of magnetically soft material such as permalloy is formed on spacing layer 12 by well-known photolithographic techniques.

The pattern can be seen to include V-shaped elements which repeat to form a multistage channel. The number of elements per stage, moreover, can be seen to change. The illustrative pattern also can be seen to close on itself to form a recirculating loop where information moves clockwise from a generator designated G in FIG. 1.

The channel is divided into two distinct areas. One area is a detector area 16 in which consecutive stages include increasing numbers of elements up to the detection stage 17. The apices of the elements of stage 17 are interconnected by a common magnetically soft magnetoresistance detector 18 as described in copending application Ser. No. 201,755 filed Nov. 25, 1971 for A. H. Bobeck, Frank Ciak and Walter Strauss. The detector 18 is connected to a utilization circuit 19 by conductor 20. The numbers of elements in the stages subsequent to the detector decrease to a minimum, shown as three.

The second area CL of the channel forms a closed loop with the first area functioning to return information which has been detected at stage 17 back into the detection area. The number of elements in each stage of area CL remains essentially constant.

An input channel 21 is defined illustratively by a multistage chevron pattern of magnetically soft elements also. Channel 21 originates at generator G and intersects with area 16.

The chevron pattern at area G is slightly modified in accordance with this invention. To be specific, the chevron pattern at G defines an originating stage where the V-shaped elements are brought illustratively into contact with layer 11 as shown in FIG. 2. Layer 12 can be seen to include an opening 25 which exposes layer 11 therebeneath to permit contact between the pattern and layer 11 at G when the chevron pattern is formed.

FIG. 1 shows an annihilator coupled to channel 21 to the left of G as viewed. The annihilator comprises a conductor coupled to one of the stages of channel 21 and connected to an annihilate pulse source 27.

Movement of domains in the arrangement of FIG. 1 is in response to a magnetic field rotating counterclockwise in the plane of layer 11. Block 28 of FIG. 1 represents a suitable in-plane field source. In practice, the size of a domain is maintained at a nominal operating value by a substantially constant bias field supplied by a source represented by block 30 of FIG. 1.

Sources 27, 28, and 30 and circuit 19 are connected to a control circuit 31 for synchronization and control. The various sources and circuits may be any such elements capable of operating in accordance with this invention.

The in-plane field supplied by source 28 rotates counterclockwise being oriented once each cycle in a direction indicated by arrow H in FIG. 2. In response to a field in this direction, poles are generated at the ends of the lengths of the chevron elements aligned with the field, that is to the right of the elements as viewed in the figures. For propagation, the poles move to the center of the chevron patterns and then to the left of the elements, as viewed, as the field reorients first upward and then to the left, respectively. Finally, domains move to positions between adjacent chevrons when the field reorients downward.

For domain generation at G, the reduction of the spacing between the pattern and layer 11 results in a significant increase in the field strength applied to layer 11 by the poles generated there by the in-plane field. The following mathematics indicate that the increased field strength is sufficient to nucleate domains at G, a result easily achieved in practice: If, for example, the thickness of the layer 11 in which single wall domains can be moved is designated *h*, the distance between layer 11 and the plane of the magnetically soft pattern at G in FIG. 1 is designated *d*, the magnetization of the magnetically soft pattern and of layer 11 is designated $M_1$ and $M_2$, respectively, and if we consider a cross-sectional area A (of the overlay pattern), then the field $H_Z$ exerted on layer 11 by the pattern (in response to the in-plane field) may be expressed by $$H_Z=\frac{M_1A}{d(d+h)} \quad (1)$$

In a representative case $M_1=600$ gauss $A=2$ microns by 0.4 micron, $d=0.1$ micron and $h=3.9$ microns.

$$\therefore H_Z=\frac{600\times 2\times 0.4}{0.1\times 4.0}=1200 \text{ oersteds} \quad (2)$$

In a practical device, a bias field $$H_b\approx \frac{4\pi M_2}{2}\approx 100$$

gauss and is opposed to an internal field of $4\pi M_2$ of typically 200 gauss. Consequently, the total field $H_T$ effective to nucleate a domain in layer 11 is $$H_T=H_{internal}-H_b+H_Z=4\pi M_2-\frac{4\pi M_2}{2}+\frac{M_1A}{d(d+h)} \quad (3)$$

For the values above, $H_T=1300$ oersteds. For a layer 11 with an anisotropy field $H_K$ of less than 1300 oersteds, a domain is nucleated.

A typical spacing layer (12 of FIG. 1) has a thickness of 1.0 micron which results in a total field of 200 oersteds on layer 11. Consequently, only at a position where the thickness of 12 is reduced, as at G in FIG. 1, are conditions met which result in the provision of a sufficient field to nucleate a domain each time the in-plane field rotates to an orientation aligned with the magnetically soft elements at G.

Figure 3:
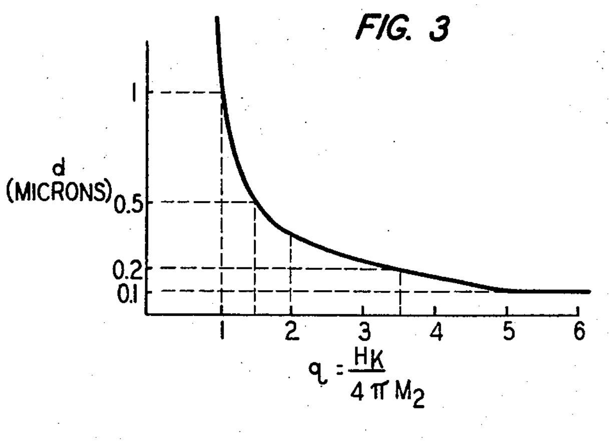
FIG. 3 is a graph showing the relationship between the pertinent parameters of a layer in which domains move and the distance between that layer and the plane of the propagation pattern.

FIG. 3 is a graph showing distance in microns between layers 11 and the plane of pattern 14 as a function of *q* which represents anisotropy field $H_K$ of layer 11 normalized to $4\pi M_2$. As is clear from the figure, for spacings of one micron, nucleation occurs for materials with *q* values of less than 1. For materials with *q* values of 3.5, a spacing of less than 0.2 micron results in nucleation.

It should be clear from the foregoing, that each cycle of the in-plane field results in the generation of a domain at G in a manner completely consistent with the field-access propagation mode, domains so generated being moved along channel 21 consistent with domain movement in channel CL.

The domains so generated do not yet represent information however. The selective annihilation of domains for forming a data stream for entry into closed loop channel 20 is achieved by the annihilator arrangement. Specifically, conductor 26 is selectively pulsed by source 27 under the control of control circuit 31 to annihilate a domain which, in each instance, occupies the stage of channel 20 coupled by conductor 26. As is well understood the annihilate pulse is of a polarity to collapse a domain and thus generate a field antiparallel to the magnetization of a domain.

Selective elimination of domains from the data stream once formed is accomplished conveniently by a second annihilate arrangement coupled to closed loop CL. This second arrangement is indicated in FIG. 1 by arrow 33 shown originating at annihilate pulse source 27.

In one specific embodiment in accordance with this invention a chevron pattern as shown in FIG. 1 was deposited on a silicon oxide layer 1.0 micron thick formed on the surface of an epitaxially grown film of YGdTmIGarnet. The epitaxial film was grown by liquid phase techniques on a nonmagnetic crystal substrate of GdGaGarnet. The epitaxial film had a thickness of 4.3 microns and was characterized by an $H_k$ of 600 oersteds. Single wall domains with nominal diameters of 6 microns were moved by a rotating in-plane field of 35 oersteds. A bias field of 90 oersteds maintained the domains at the above nominal diameter. An opening was made in the oxide layer and the chevron pattern was formed in contact with the epitaxial film there. Each cycle of the in-plane field produced a domain which was selectively annihilated by a pulse of 200 milliamperes in conductor 26. Domain patterns so produced were expanded by the increasingly larger numbers of elements in the consecutive stage of area 14 of FIG. 1 and produced output signals of 150 microvolts. The domains, after detection, were reduced in size by the decreasing numbers of elements in the stages subsequent to the detector for recirculation in channel CL.

Although the invention has been described in terms of a fine-grained propagation pattern of chevron geometry, it should be apparent that other field-access geometries are adaptable to this end.

What has been described is considered merely illustrative of the principles of this invention. Therefore, various modifications can be devised by those skilled in the art in accordance with those principles within the spirit and scope of this invention. For example, a controlled generator may be provided in accordance with this invention by providing means for locally changing the bias field at G in FIG. 1 in order to controllably alter the nucleation conditions in accordance with Equation 3. Annihilate conductor 26 would be unnecessary in this instance.

What is claimed is:

1. A magnetic arrangement comprising a layer of material in which single wall domains can be moved and a pattern of elements for defining in said layer a propagation channel for moving single wall domains therealong in response to a first magnetic field reorienting in said layer, said pattern and said layer being separated a first distance except in a localized area, said pattern and said layer being separated in said localized area a second distance smaller than said first distance sufficiently such that said first magnetic field causes domains to be generated there.

2. A magnetic arrangement in accordance with claim 1 wherein said second distance is vanishingly small.

3. A magnetic arrangement in accordance with claim 1 wherein said pattern comprises repetitive V-shaped elements defining a multistage pattern including a first stage in which ends of said elements correspond to said localized area.

4. A magnetic arrangement in accordance with claim 3 wherein said pattern is formed on a spacing layer including an opening at said localized area.

5. A magnetic arrangement in accordance with claim 4 wherein said layer has a first magnetization in a direction out of the plane of said layer and an anistropy $H_k$ and said first magnetic field is applied in a manner such that said elements produce a field $H_z$ antiparallel to said magnetization, said first distance being chosen such that $H_z<H_k$ and said second distance being chosen such that $H_z>H_k$.

6. A magnetic arrangement in accordance with claim 5 wherein said ends are defined by elements aligned in a first direction in said plane, and said first magnetic field generates said field $H_z$ only when said first field is aligned in said first direction.

7. A magnetic arrangement in accordance with claim 6 also including means for providing said first magnetic field.

8. A magnetic arrangement in accordance with claim 7 also including means for selectively annihilating domains generated in said localized area.

References Cited

UNITED STATES PATENTS 3,541,534 11/1970 Bobeck et al. ..... 340—174 TF

JAMES W. MOFFITT, Primary Examiner

U.S. Cl. X.R.

340—174 EB, 174 VA